May 1, 1934.  R. GOLLERT  1,956,739

COOLING DEVICE FOR TIRES

Filed March 14, 1932

Patented May 1, 1934

1,956,739

UNITED STATES PATENT OFFICE 1,956,739

COOLING DEVICE FOR TIRES

Reinhold Gollert, Berlin-Charlottenburg, Germany

Application March 14, 1932, Serial No. 598,708
In Germany March 14, 1931

3 Claims. (Cl. 152—13)

The object of the invention is, to prevent excessive heating of the hollow tires of automobiles by continually cooling the walls of the hollow space.

The known endeavours of this kind, when a liquid filling was used, could not attain this object, because the enclosed liquid, surrounded by rubber, could not radiate the absorbed heat. The employment of metallic heat conductors was however useless, because these did not absorb sufficient heat from the walls of the hollow space. Their surfaces could only have a slight contact with the rubber surfaces to be cooled; the air otherwise surrounding them was an insulator.

The invention employs a pliable, preferably filling material capable to flow for moistening the walls of the hollow space and therefore for completely absorbing the heat which they have to give up. Moreover, the many times greater conductivity of this material, as compared with that of the rubber, is utilized for accelerating the transmission of the heat absorbed to metallic conductors, the surfaces of which for absorbing the heat can be smaller in the same proportion as the inner walls of the rubber body radiating the heat.

As metallic conductors possess 11000 times better conducting properties than rubber, very small cross sections are sufficient for conducting off the entire quantity of heat absorbed. It is preferable, however, for relatively large surfaces of the metallic conductors to be in permanent or periodical contact with the filling liquid, in order to act immediately the heating commences and to prevent steam generation.

Consequently, the invention relates to the employment of several bodies having different properties and conductivities; some of these bodies serving for absorbing and accumulating the heat to be given up by the walls of the hollow space and others for conducting off the collected heat to the outer side of the tire.

The main advantages derived from this combination according to the invention are:—

1. The possibility of employing any type of hollow tire.

2. The effect commences immediately at the beginning of travel before steam develops, thus resulting in saving the material, a longer life and less wear of the tire.

3. Continuous cooling, complete absorption and conducting off of the heat.

4. More rapid cooling during pauses in travelling.

5. Smaller filling quantity, therefore no decrease in elasticity.

6. No failure when in operation, no attendance, no endangering of fittings or of the tire.

7. Cheap and easy to produce and fit.

In tires for lower stressing, which are shrunk on a steel band, it is sufficient to provide recesses in the foot of the rubber body, which allow the exposed surfaces of the steel band to come into contact with the liquid and thus utilize the steel band for conducting off the heat to the wheel body. The contacting of the liquid and the steel band may be effected by the progressively moving wave which is produced in the liquid when the vehicle is travelling, owing to the compression of the rubber body under the load.

It is preferable, to insert metal plugs in the tire foot, which plugs project into the hollow space and are fitted with large surface structures, such as wire brushes, cords, plates and the like, in order to offer suitably large absorbing surfaces to the liquid flushing the same. In the case of pneumatic tires such elements can be fitted in the inner tube in a similar manner as the valve. These elements may also be made with a large surface on the outer surface for better conducting off to bad conductors.

Two embodiments of the invention are illustrated by way of example in the accompanying drawing in which:—

Figure 1:
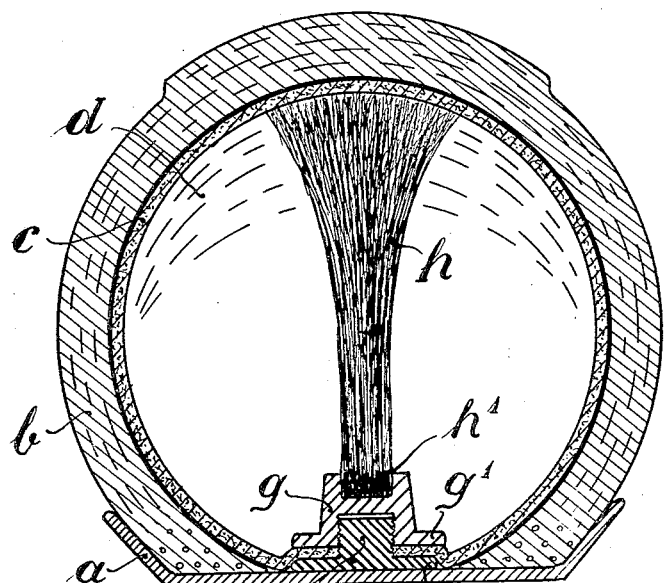
Fig. 1 shows in cross section a pneumatic tire with a metal bundle.

In Fig. 1 $a$ designates the rim, $b$ the outer cover, $c$ the inner tube and $d$ the liquid which, when the wheel is rotating, is situated radially beyond the centre of the outer cover owing to the action of the centrifugal force. $f$ and $g$ are the lower and upper parts respectively of a screw connection, which extends through the inner tube $c$ and clamps and packs the hole between the flanges $f'$ and $g'$. The flange $f'$ is pressed against the rim, and the foot $h'$ of a wire bundle $h$ is inserted in the upper part $g$, the free end of this bundle extending up to the inner wall of the inner tube $c$, so that the liquid is always in contact with the wire bundle.

Figure 2:
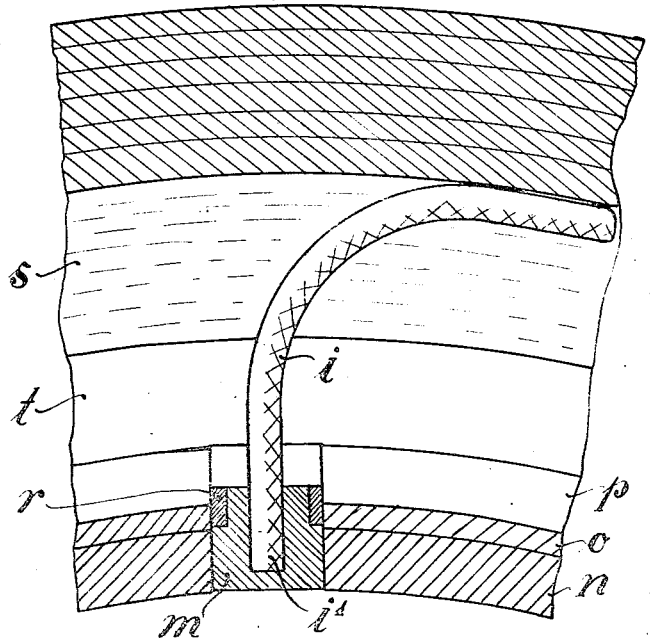
Fig. 2 is a part longitudinal section of a hollow tire with a cord.

In Fig. 2 a cord $i$ is provided instead of the wire bundle. The free end of this cord extends into the hollow space, whereas its end $i'$ is mounted in a metal foot $m$, which is inserted into the steel band $n$; the cord or its foot extends through the rubber layers $o$ and $p$, and a packing ring $r$ is clamped between the metal foot $m$ and the wall of the hole. The liquid s is in the hollow space on the outer side owing to the action of the centrifugal force.

The liquid introduced into the tire immediately and continually absorbs from the tire walls the heat produced in the tire and, as it is a better conductor of heat than rubber, gives up this heat more quickly to the metallic conductors which conduct same off rapidly to the large wheel body.

This device therefore effects the cooling within generating of steam.

I claim:—

1. A motor vehicle tire with filling of cooling liquid comprising metallic conductors extending into the hollow space of the tire and dipping into the cooling liquid to absorb from said liquid the heat taken up by the liquid whilst the vehicle is travelling and when it is at a standstill and to conduct this absorbed heat to the outside of the tire.

2. A motor vehicle tire as specified in claim 1, comprising in combination with the wheel rim and the heat conducting element, a foot on said rim carrying said heat conducting element adapted to indirectly establish heat communication between the interior of the tire and the atmosphere.

3. A motor vehicle tire as specified in claim 1, comprising in combination with the heat conducting element and the rim of the wheel, a steel band on said rim, and a foot carrying said heat conducting element extending through said steel band and said rim adapted to directly establish heat communication between the interior of the tire and the atmosphere.

REINHOLD GOLLERT.